US005307520A

United States Patent [19]

Oyamada et al.

[11] Patent Number: 5,307,520

[45] Date of Patent: Apr. 26, 1994

[54] WATCH TYPE PAGING RECEIVER

[75] Inventors: Takashi Oyamada, Tokyo; Masahiro Wada, Chiba, both of Japan

[73] Assignees: NEC Corporation; Nippon Telegraph and Telephone Corporation, both of Tokyo, Japan

[21] Appl. No.: 800,003

[22] Filed: Nov. 29, 1991

[30] Foreign Application Priority Data

Nov. 30, 1990 [JP] Japan .................................. 2-336544

[51] Int. Cl.[5] ................................................ H04B 1/16

[52] U.S. Cl. .................................... 455/347; 455/351; 455/343; 368/204

[58] Field of Search .................... 455/89, 90, 347, 351, 455/343; 368/203, 204; 429/84, 86

[56] References Cited

U.S. PATENT DOCUMENTS

| | | | |
|---|---|---|---|
| 3,507,708 | 4/1970 | Vignaud | 429/86 |
| 3,904,441 | 9/1975 | Badger | 429/86 |
| 3,909,302 | 9/1975 | Mermelstein | 429/86 |
| 4,636,446 | 1/1987 | Lee | 429/86 |
| 5,007,105 | 4/1991 | Kudom et al. | 455/351 |
| 5,187,746 | 2/1993 | Narisawa | 426/86 |

FOREIGN PATENT DOCUMENTS

| | | |
|---|---|---|
| 91/08597 | 6/1991 | European Pat. Off. . |
| 2804206 | 8/1979 | Fed. Rep. of Germany . |
| 55-15028 | 2/1980 | Japan . |
| 55-15037 | 2/1980 | Japan . |
| 56-15568 | 2/1981 | Japan . |
| 2162679 | 2/1986 | United Kingdom . |

*Primary Examiner*—Reinhard J. Eisenzopf
*Assistant Examiner*—Chi Pham
*Attorney, Agent, or Firm*—Sughrue, Mion, Zinn, Macpeak & Seas

[57] ABSTRACT

A watch type paging receiver which may be waterproof in the daily life and operated with an air cell is provided. Each of a body casing which is accommodating a receiver and a battery casing which is holding a battery accommodated within the body casing is provided with an air vent by which the inside of the battery casing communicates with the outside of the body. The air vent is formed of hole in a battery casing wall being adjacent to the belt and the air vent of the battery casing is provided with a porous waterproofing filter. An air vent communicating from inside to outside is opened at the portion corresponding to each air vent of the body casing and the battery casing.

4 Claims, 2 Drawing Sheets

WATCH TYPE PAGING RECEIVER

BACKGROUND OF THE INVENTION

The present invention relates to a watch type paging receiver and, more particularly, to a receiver using an air cell or so called air-zinc cell of non-returnable type for the battery.

Depending on the development and popularization of a paging receiver or so called "pocket bell" in recent year, minimization of a receiver of this kind has been promoted every year. For the receiver of this kind, as a form of a user interface, various kinds of new types such as from a conventional match box type up to a pencil type, a card type and a watch type have been introduced one after another into the market. One with the box type has substantially the same structure as the general watches, however, the essentially different point thereof from the other is to require a relatively larger battery capacity for driving a receiver circuit and yet extremely many times of replacements of the batteries.

An example of combination of a solar cell and a secondary battery is disclosed in U.S. Pat. No. 5,007,105 as a watch type paging receiver where a difficulty in charging by removing the secondary battery has been eliminated, notwithstanding a drawback still remains in higher cost, heavy weight and the like due to the increase of the number of components.

Hitherto, as a battery for a watch type paging receiver, a lithium cell or a nickel cadmium cell have been utilized despite of the limited capacity of the battery. Accordingly, the battery need to be replaced relatively in frequent. This requires a structure of the receiver for easy replacement of the battery, and in general a rear cover to be provided on a body casing of the receiver is made releasable and thus such structure that the battery is replacable by moving the rear cover has been employed.

On the other hand, in order to secure a waterproof arrangements within a receiver, various kinds of waterproof structures are adopted so as to prevent deterioration of a waterproof characteristic even when the rear cover is released.

Recently, the development of the air cell or air-zinc cell has been promoted, and presently one with a relatively larger capacity may thus be obtained. Even in the card type paging receiver or the watch type paging receiver as hereinbefore described, the air cell is intended to be used instead of the conventional lithium cell and nickel cadmium cell.

As an air cell of this kind, there has been introduced a coin type air cell of PR 2330 manufactured by Matsushita Denti Industrial Co., Ltd., which coin type air cell is commercially available with compact feature, light weight, and larger electric capacity and is optimum to the paging receiver.

In an air cell of this kind, however, air supply is needed for generating an electric power which in turn requires to secure air permeability for communicating between the battery and the outside of the body when the battery is accommodated inside the body. In this case, the air cell may not be advantageously available to the conventional watch type receiver. Namely, the watch type receiver requires the waterproof characteristic at the extent where no difficulty arises in the daily life and in particular it provides a closure construction for the rear cover so as to eliminate a problem due to sweating or the like from a human body when it is applied to the person's wrist. Therefore, when the air cell modification is used for the watch type receiver provided with such a counter measure of waterproof, the air supply comes impossible and thus an operation of the air cell is stopped.

SUMMARY OF THE INVENTION

An object of the present invention is to provide a watch type paging receiver capable of securing a waterproof characteristic as required in daily life and employing an air cell.

A watch type paging receiver according to the present invention has air vents on both of a body casing accommodating electronic components which constitute a receiver therein and a battery casing holding batteries accommodated in the body casing, thereby the inside of the battery casing and the outside of the body casing are constructed to communicate each other.

The air vents are formed of holes penetrating a wall in adjacent with a belt of the body casing and the battery casing and a waterproof filter with air permeability is provided on the air vent of the battery casing.

Another air vent communicating from the inside to the outside is provided on the belt at the portion corresponding to the air vents of the body casing and the battery casing.

According to the present invention, a watch type paging receiver using an air cell may be realized by securing a waterproof characteristic as required in daily life and by ensuring air permeability between the inside of the battery casing and the outside of the body casing.

BRIEF DESCRIPTION OF THE DRAWINGS

The present invention will now be explained in more detail to the accompanying drawings in which.

DESCRIPTION OF THE PREFERRED EMBODIMENTS

Figure 1:
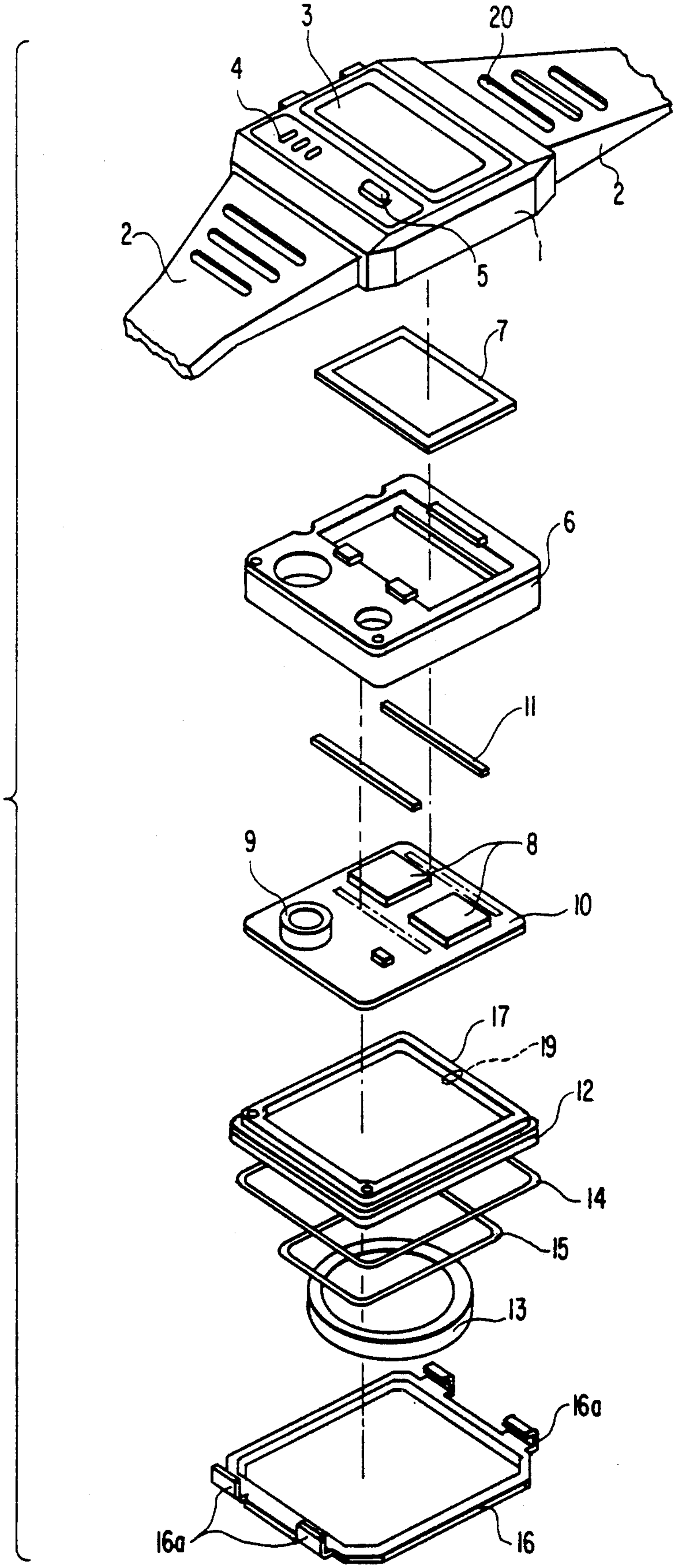
FIG. 1 is a partially exploded perspective view of one embodiment of the watch type paging receiver in accordance with the present invention.

Preferred embodiments of the watch type paging receiver in accordance with the present invention will hereinafter be described in detail with reference to the accompanying drawings.

In the drawings, a paging receiver of the invention provides a belt 2 connected to a body casing 1 and may be applied to the person's wrist with use of the belt 2 where the person uses the paging receiver. An LCD (liquid crystal display) window 3, a speaker aperture 4 for passing the calling tone and a reset button 5 for stopping the calling tone or the like are arranged on the front face of the body casing 1.

An inner frame 6 is provided within the body casing 1. In the body casing 1, the LCD 7 is supported by the frame 6. A printing plate 10 loads various kinds of electronics components 8. A speaker 9 is mounted on the inner frame 6 and is electrically connected to the LCD 7 through a conductive rubber or connector 11. A battery casing 12 is mounted within the lower side of the inner frame 6 of the body casing 1 and the battery casing 12 accommodates an air cell 13. Then, the printing plate 10 and the like are adapted to be of waterproof by inserting a packing 14 between the peripheral face of the battery casing 12 and the inner face of the body casing 1. A packing 15 is arranged on the lower face of the battery casing 12 and a waterproof construction functional to the rear cover 16 to be mounted on the rear face of the body casing 1 is provided. The rear cover 16 may be mounted by allowing the fitting pawls 16a provided on the four corners to engage with a part of the body casing 1.

In the battery casing 12, an air permeability characteristic is secured between the inside of the battery casing 12 and the outside of the body casing 1 by penetrating an air vent 17 onto a part of the side wall and by penetrating an air vent 18 onto the portion corresponding to the body casing 1. While on the other hand, a waterproof construction is insured inside of the air vent 17 provided on the battery casing 12 by inserting a waterproof filter 19 or material with air permeability but without passing the water into the air vent 17. Still in this example, an air vent 20 penetrating from the inside to the outside is provided also in the belt 2 at the portion corresponding to the air vent 18 of the body casing 1.

A structure for electrically conducting across the battery 13 and the plate 10 is not shown, but they are connected using a blade spring and the like.

In the structure hereinbefore described, by way of the packing 14 inserted between the inside face of the body casing 1 and the peripheral face of the battery casing 12, a waterproof construction is secured for the components mounted on the inside between the body casing 1 and the battery casing 12, such as the inner frame 6, the LCD 7, the printing plate 10 and the like. The inside of the battery casing 12 is maintained in waterproof by the packing 15 inserted between the lower face of the battery casing 12 and the rear cover 16. The inside of the battery casing 12 is communicated to the outside of the body casing 1 through the air vent 17 of the battery casing 12 and the air vent 18 of the body casing 1, which ensures an operation of the air cell 13 and is available as a power supply for the receiver. Even in providing the air vents 17 and 18 as hereinbefore described, the waterproof filter 19 provided in the air vent 17 prevents moisture from entering the battery casing 12 through air vent 17 without deteriorating a waterproof effect within the battery casing 12.

As a waterproof filter 19, for example, GORE-TEX (a registered trademark) manufactured by Japan Goretex Co., Ltd., and commercially available is recommended with a high grade of air permeability and very suitable for the filter.

Figure 2:
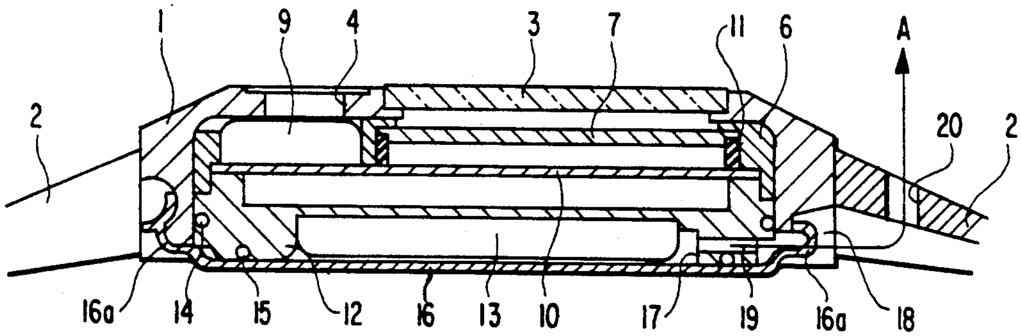
FIG. 2 is a vertical sectional view showing an internal structure of a receiver.

In the present embodiment, since an air vent 20 is provided on the belt 2 for communicating from the inside to the outside, a satisfactory air vent permeability is performed by communicating the respective air vents 18, 17 of the body casing 1 and the battery casing 12 onto the outside through the air vent 20 even in fitting of the inner face of the belt 2 on the skin when the person put the belt 2 on his wrist. An air communication path identified by an arrow mark A in FIG. 2 and formed by these air vents is positioned where no waterdrop is assumed to directly fall during the daily life. It is needless to say, however, that other portions may also be available.

Figure 3:
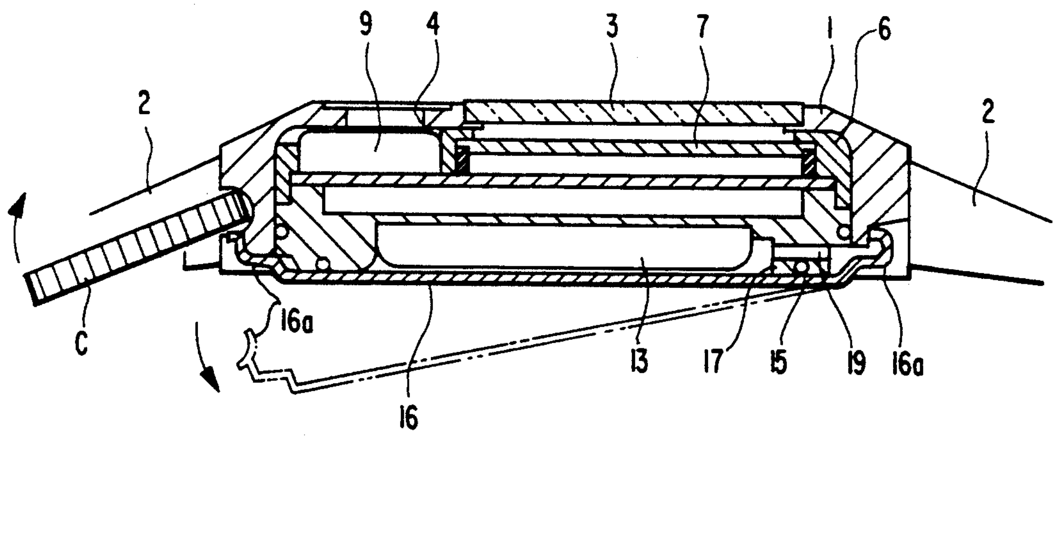
FIG. 3 is a vertical sectional view of the receiver showing the state when a rear cover is removed.

A replacement of the air cell 13 as shown in FIG. 3 includes several steps, namely, an insertion a coin C and the like into a clearance formed between the rear cover 16 and the body casing 1, powerful screw of the coin C and thus a separation of the fitting pawl 16a of the rear cover 16 from part of the body casing 1 as shown by dotted lines in the drawing, removing the rear cover 16 from the body casing 1 and thereby exposing the inside of the battery casing 12.

As hereinbefore fully described, according to the present invention, a watch type paging receiver may be realized by securing an air permeability to the outside required for an air cell since the inside of the battery casing and the outside of the body casing are constituted to communicate each other by providing the air vents respectively on the body casing and the battery casing.

By way of inserting a waterproof filter in the air vent, a waterproof level in the daily life required for the wristwatch may be attained to obtain a water type paging receiver using an air cell.

A very suitable air permeability characteristic may also be obtained by providing an air vent on the belt even in the state where the receiver is placed on the wrist.

What is claimed is:

1. A watch type paging receiver comprising:

electronic components for operating said watch type paging receiver;

a body casing having an opened bottom portion defining an internal space therein, said electronic components being disposed in said internal space;

an air cell for electrically operating said electronic components;

a battery casing disposed in the internal space of said body casing together with said electronic components, said battery casing accommodating said air cell therein;

a rear cover for enclosing the opened bottom portion of said body casing;

a band joined to said body casing and adapted to be fastened on a person's wrist; and air ventilating means for ventilating said battery casing in said internal space, said ventilating means extending from said internal space to the outside of said band via said battery casing, said body casing and said band.

2. A watch type paging receiver as recited in claim 1, wherein said air ventilating means comprises:

a plurality of air vents provided through both the battery casing and the body casing; and a plurality of additional air vents formed in said band in the vicinity of said body casing to communicate the air vents of said body casing with said additional air vents, thereby communicating the air vents of said battery casing with the outside.

3. A watch type paging receiver as recited in claim 2, wherein said air ventilating means further comprises:

a waterproof filter which has air permeability and which is located in each of the air vents of said battery casing.

4. A watch type paging receiver as claimed in claim 2, wherein each of said air vents and said additional air vents is defined by a through hole formed in said battery casing, said body casing, and said band.

* * * * *